| United States Patent [19] | [11] Patent Number: 4,552,772 |
| Saitoh et al. | [45] Date of Patent: Nov. 12, 1985 |

[54] PROCESS FOR PREPARING BOILED NOODLES

[75] Inventors: Hiroshi Saitoh; Katsuyuki Kadooka; Mamoru Tsukamoto, all of Utsunomiya; Shoji Ono, Tatebayashi; Masaki Ohkawa, Tokyo, all of Japan

[73] Assignee: Ma-Ma Macaroni Co., Ltd., Japan

[21] Appl. No.: 523,892

[22] Filed: Aug. 15, 1983

Related U.S. Application Data

[63] Continuation of Ser. No. 312,259, Oct. 13, 1981, abandoned.

[30] Foreign Application Priority Data

Jun. 12, 1981 [JP] Japan ................................. 56-91424

[51] Int. Cl.$^4$ ............................................... A23L 1/16
[52] U.S. Cl. ..................................... 426/557; 426/451
[58] Field of Search ................ 426/557, 451, 626, 302

[56] References Cited

U.S. PATENT DOCUMENTS

| 2,434,388 | 1/1948 | Brehm ................................. 426/557 |
| 3,495,989 | 2/1970 | Lewis et al. ........................ 426/557 |

FOREIGN PATENT DOCUMENTS

| 48-26227 | 8/1973 | Japan .................................. 426/557 |
| 53-20448 | 2/1978 | Japan .................................. 426/557 |
| 53-37423 | 10/1978 | Japan .................................. 426/557 |

*Primary Examiner*—George Yeung
*Attorney, Agent, or Firm*—Jordan B. Bierman

[57] ABSTRACT

Combination use of citric and/or lactic acid with table salt in one solution is extremely effective to enhance the preservability of boiled noodle products to be commercially distributed at an ambient temperature. Boiled noodles are subjected to immersion treatment with the aqueous solution containing said combination and then, without rinsing, packaged and heat sterilized for commercial distribution. Additional use of sodium glutamate is proposed for improving palatability if desired.

17 Claims, No Drawings

PROCESS FOR PREPARING BOILED NOODLES

This application is a continuation application of Ser. No. 312,259, filed Oct. 13, 1981, now abandoned.

This invention relates to a process for preparing noodles and more particularly is concerned with a process for preparing packed boiled noodles capable of being commercially distributed at ambient temperature.

In preparing so-called boiled noodles, sterilization treatment of the boiled noodles with hydrogen peroxide was deemed in the past to be the most effective temporary measure to enhance the possibility of commercial distribution thereof. In view of anxiety for adverse effect on human health, however, there is no alternative but to suspend the use of hydrogen peroxide in present circumstances. As a substitution for the use of hydrogen peroxide, there has been proposed a process known physically as so-called retort treatment. This process, however, has not commercially established yet, because gumming or coloration of noodles treated thereby is brought about and, moreover, packing materials and apparatuses necessary therefor unavoidably raise the cost of production. Further, some chemical treatment processes have been proposed for the purpose, though they have both merits and demerits. For instance, a process relying on addition to noodles of alcohol and lower fatty acid esters or on immersion therein of the noodles cannot be put in practical use in point of taste with relish, because the use of said alcohol and said esters in high concentration is necessary to preserve the treated noodles for a long period of time, though the process is serviceable to maintain antibacterial activity of the treated noodles to a considerable extend. Lysozyme treatment is a process which costs dearly and the effect thereof is not prudential. In view of popularity in character of the goods with which the present invention deals, therefore, it is difficult to put it to practical use. Combination use of organic acids with fatty acid esters, glycine, alcohol, etc., is actually used to a certain extent this present. In order to assure satisfactory taste of the noodles with relish according to the process relying on the combination use of such additives, however, there is no alternative but to reduce the additives in amount, thereby rendering the treated noodles distributable commercially for a period of about one week, or to increase the additives in amount in order to attain commercial distribution thereof at ambient temperature for a long period of time (3 months), sacrificing the taste with relish of the treated noodles. Finally, there is known a process as a special embodiment of the above-mentioned process wherein noodles are treated with an organic acid to reduce usually in pH up to 5.0 and up to 4.5 in the extreme. Although noodles are improved in their preservability when a pH value thereof is reduced, it is impossible to reduce the pH value to a level of lower than 4.5. It is a technical knowledge common to those skilled in the art that even when the pH value of noodles is reduced by any chance to a level of lower than 4.5, there is no way of preventing such drawbacks that because of their strong acid taste, the thus treated noodles will no longer be serviceable for ordinary cooking, will suffer from severe roughness when they are boiled, will be too soft, and they will mutually adhere to one another or conspicuously suffer from roughness when they are fried in a hot pan.

Extensive researchers prosecuted by the present inventors on the above-mentioned subject have resulted in the finding that, contrary to the prior art general concept, boiled noodles can be prevented from rot over such long period of 6 months or so at a temperature of about 37° C. while avoiding deterioration in taste of the boiled noodles by the use of a specific organic acid in an amount sufficient to reduce a pH value of the boiled noodles to a level lower than 4.3 and table salt and, if necessary, allowing sodium glutamate to coexist therewith.

In accordance with the present invention, there is provided a process for preparing wheat flour-based noodles capable of being commercially distributed at ambient temperature and of being ready for cooking in a moment, characterized in that wheat flour-based noodles shaped into desired form are boiled, water-washed and then subjected to immersion treatment in an aqueous solution containing (a) citric acid or lactic acid or mixtures thereof and (b) table salt and, if necessary, (c) sodium glutamate, followed by packaging and heat sterilization.

The process according to the present invention is fundamentally different from the prior art process wherein citric acid and/or lactic acid, table salt, sodium glutamate, etc. are mixed with starting wheat flour at the time of preparing noodles (where a dough is formed by adding water to the starting wheat flour) in that in the present process the shaped noodles are boiled and then immersed for a short time in an aqueous solution containing citric acid and/or lactic acid, table salt and sodium glutamate. If the ingredients which are to be present in the treatment solution according to the present invention are incorporated from the beginning into a dough at the time of preparing noodles, an elution loss of the ingredients into the boiling water during the boiling step of the noodles becomes large, with the result that not only the quantitative control of the ingredients which are to be adherent to the end product noodles inherently becomes difficult but also the use of such large amounts of the ingredients as may adversely affect the noodle quality sometimes happens. As mentioned previously, the incorporation of the organic acid into the dough at the time of preparing noodles terribly deteriorates the noodle quality.

In practicing the present invention, boiled noodles are immersed for 30–60 seconds, preferably 45–60 seconds, in an aqueous solution which has previously been prepared in such a manner that a concentration in the solution of citric acid and/or lactic acid is 1.0–0.4%, preferably 0.8–0.5%, that of table salt is 0.8–0.2%, preferably 0.6–0.3% and, if necessary, that of sodium glutamate is 0.09–0.02%, preferably 0.06–0.04%, and the temperature of the solution is kept at ambient temperature up to 50° C., preferably 30°–40° C. Thereafter, the noodles thus treated are put into a package and the package is sealed, followed by sterilization using such heating means as hot vapor or water. The boiled noodles thus obtained have a pH of 3.9–4.3 as measured according to the pH measuring method (10 g of the noodles charged with 50 ml of distilled water are homogenized and allowed to stand for 30 minutes and then measured for pH with an electrode type pH meter) commonly adopted in this technical field. Further, the amount of table salt adherent to the noodles is 0.05–0.15% and that of sodium glutamate, when used if any, is 0.01–0.02%.

The process of the present invention is applicable to boiled noodles out of wheat flour-based noodles. The expression, "boiled noodles", used in the specification is to mean that the noodles have already been treated in boiling water so that such noodles are ready for quick cooking. The term, "table salt", as used herein means sodium chloride. Further, the term, "noodles"or "Pastas", as used herein should be understood in the broadest sense to cover not only typical Japanese style noodles mainly composed of wheat flour added with or without eggs or yolks, but also any kinds of pastas including macaroni, spaghetti and vermicelli. The expression, "wheat flour-based", as used herein is to mean that the product concerned is mainly composed of wheat flour of any type including semolina, and said expression does not intend to exclude the inclusion of any other additives into the wheat flour.

By utilizing the present invention for the preparation of boiled noodles of the above-mentioned types, it is possible to commercially distribute said boiled noodles at ambient temperature with substantial safety over a long period of 6 months, whereby no hindrance is brought about to the taste inherent in boiled noodles and no particular increase in the production cost is entailed. In accordance with the present invention, there has been found that, contrary to the prior art common concept, the solution treatment according to the present process is successful in reducing a pH value of boiled noodles to a level lower than about 3.9–4.3 and thereby to attain an unexpected possibility of commercial distribution of the boiled noodle products at ambient temperature for a long period of time and, at the same time, that the deterioration in taste of the boiled noodle products inherent to the lower pH value thereof can be covered up by the coexistence therewith of table salt.

Boiled noodles which are to be treated according to the process of the present invention are prepared in the manner known to those skilled in the art. That is, starting materials for making noodles, such as wheat flour or the like, are charged with appropriate amounts of water and then kneaded, and the kneaded product, in case it is wheat flour noodles of the Japanese style, is rolled and shaped into a desired form by means of cutting blade. In the case of macaroni, spaghetti, etc., the kneaded dough is extruded, as it is, into a desired form by means of high pressure extrusion technique. The noodles shaped into a desired form in the above manner are boiled and then water-washed to prepare so-called boiled noodles.

In order to facilitate further the understanding of characteristic features of the process of the present invention, each feature is explained hereinafter with reference to data obtained therefor. First, in the present process, it is essential to use citric acid or lactic acid, particularly both of them. From the standpoint of preservability, it is necessary that the boiled noodles according to the present invention should have a pH value of 3.9–4.3. Although such pH value, per se, can be attained by the use of various organic acids, it has now been found that among such usable organic acids the use of citric acid or lactic acid, particularly combination use of citric acid and lactic acid, is suitable for attaining the desired pH value. The selection of citric acid or lactic acid or both of them is decided depending on their inherent tastes such as sourness, astringency and bitterness. Then, illustrated below is the taste of boiled noodles when they are treated respectively with various organic acids in accordance with the process of the present invention.

| Organic acid | Taste | Practical usefulness |
|---|---|---|
| Malic acid | Refreshing sourness but stimulative | Poor |
| Tartaric acid | Strong sourness and astringency | Poor |
| Gluconic acid | Mild sourness but bitterness as aftertaste | Poor |
| Citric acid | Mild and refreshing sourness and weakly stimulative (feels somewhat cool) | Good |
| Lactic acid | Non-direct, mild and weak sourness but somewhat bitter | Good |
| Citric acid/ lactic acid | Considerably weak sourness, when compared with individual acids used singly, without astringency, etc. | Particularly good |

The following are the results of investigation conducted to obtain the relationship between pH and preservability of boiled noodles when treated with citric acid.

| Number of bacteria on noodles before boiling | pH of noodles | | | | | |
|---|---|---|---|---|---|---|
| | 4.1 | 4.2 | 4.3 | 4.4 | 4.5 | 4.6 |
| $10^4$–$10^5$/g | 0 | 0 | 0–2 (0.6) | 51–74 (62) | 204–313 (251) | 400–530 (463) |
| $10^2$–$10^3$/g | 0 | 0 | 0 | 21–33 (22) | 108–256 (174) | 350–466 (401) |

The above data showing the minimal and maximal values of the number of spoiled boiled noodles were obtained in the tests mentioned above, wherein 5 lots, each consisting of 2000 packages of boiled noodles to be inspected, were stored at 37° C. for 6 months, while the parenthesized are such values as averaged.

From the data shown above, it is understood that critically important is to adjust a pH of boiled noodles to below 4.3 from the standpoint of preservability of the noodles. With the view of lightening sourness of such boiled noodle products, the present inventors prosecuted researches and have eventually realized that the palatable taste of boiled noodles is markedly improved by the use of table salt in combination with sodium glutamate according to circumstances. In obtaining boiled noodles of pH 4.1 by the use of an aqueous citric acid solution while adding thereto varying amounts of table salt and sodium glutamate, organoleptic test results obtained as to the sourness, salty taste and taste of sodium glutamate of the resultant boiled noodle products were as in the following.

| Amounts of table salt and sodium glutamate adhered to noodles | | Organoleptic test results of boiled noodle product (pH 4.1) | | |
|---|---|---|---|---|
| Table salt | Sodium glutamate | Sourness | Salty taste | Taste of sodium glutamate |
| <0.05% | — | + | — | — |
| 0.05–0.15% | — | — | — | — |
| >0.15% | — | — | + | — |
| — | <0.01% | + | — | — |
| — | 0.01–0.02% | — | — | + |
| — | >0.02% | — | — | + |
| 0.05–0.15% | 0.01–0.02% | — | — | — |

It is understood from the above data that the taste of boiled noodles thus treated can perfectly be normalized palatably by virtue of allowing 0.05–0.15% of table salt (0.01–0.02% of sodium glutamate may be allowed to coexist therewith if desired) to adhere to the boiled noodles.

There has been no such precedent heretofore, wherein even for any purposes table salt was mixed, or allowed to adhere to, in boiled noodle products, such as spaghetti or macaroni. In the case of boiled wheat flour noodles of Japanese style (boiled noodles in a narrow sense), table salt is often added, together with water, to wheat flour in the stage of making noodles (dough formation), however, the purpose of the addition of table salt is not at all to improve palatable taste of the noodles but is to tighten noodle dough while promoting gluten formation or prevent said noodle dough from attaching to a noodle-making machine. In the use of table salt according to the prrior art, the salt is usually dissolved in water which is to be added to wheat flour in the initial step of noodle-making process, and the amount of the salt added is considerably large, e.g. 2–3% based on raw noodle (5–8% in the case of handmade noodle) and considerable portion of the salt remains in the boiled noodles even when the salt has flowed by elution into boiling water. However, the amount of table salt used in the process of the present invention is such very small as less than 0.15%, and the purpose of usingthe salt is to lighten sourness and improve physical properties of the boiled noodles (prevention of excessive softening noodle and of rough appearance when a pH thereof is lowered), and thus the use of table salt according to the present process is different in its purposes from the prior art use of table salt in noodle-making. Furthermore, the present process is applicable to boiled wheat flour noodles after Japanese style which have been made while incorporating table salt into noodle dough at the time of preparation thereof, but it should be construed that the presence of table salt incorporated into the noodle dough is not an essential requisite in the present process. Recent eating habits tend rather to reduce the salt content in foods as lower as possible, and under such circumstances the present process may be said to possess a prominent advantage, wherein perfect improvement in palatable taste of boiled noodles can be realized by simply providing the boiled noodles with small amounts of table salt which is allowed to adhere to therein.

It is to be understood that during immersion treatment with boiling water, the α-conversion of wheat flour starch is achieved up to 50–70%, and some marginal conversion is expected at the stage of heat sterilization. Because of this, the boiled noodle product obtained from the present invention is very quickly brought up to an edible state.

Examples of the present invention are given below in order to illustrate the invention more concretely, but is should be construed that the examples are in no sense limitative.

EXAMPLE 1

Boiled noodles of the Japanese style were made according to the usual way in a noodle-making line capable of making 30 packages per minute, each package containing 200 g of boiled noodles as one meal portion, by processing 6 bags of wheat flour (each bag containing 25 kg) per hour. In a 350 l vessel, 2.4 kg of citric acid, 1.2 kg of table salt and 150 g of sodium glutamate were dissolved in water to make 300 l of a processing solution. Into this processing solution were immersed boiled noodles for 45 seconds, followed by draining.

The boiled noodles thus treated were packaged and subjected to boiling water treatment at 95° C. for 30 minutes. This packaged boiled noodles had a pH of 4.1, and 0.1% of table salt and 0.01% of sodium glutamate, both having adhered to the noodles.

The processing solution thus used is kept at 30° C. and charged dropwise with 20 ml per minute of a 50% aqueous citric acid solution and 35 ml each of a 20% table salt water and of a 2% aqueous sodium glutamate solution so that the processing solution maintain its initial concentration.

2000 Packages of boiled noodles thus treated were stored at 37° C. for 6 months, whereupon no spoiled product was found and both noodle quality and palatable taste thereof were found excellent.

EXAMPLE 2

The same treatment as in Example 1 was repeated, except that a 1:2 mixture of 800 g of citric acid and 1600 g of lactic acid was used in place of the citric acid used singly. The thus treated boiled noodles as packaged had a pH 4.0 and exhibited preservative effect similar to that shown in Example 1, retaining favorable noodle quality and the palatable taste of the boiled noodles were more superior over that of the boiled noodles obtained in Example 1.

EXAMPLE 3

The same treatment as in Example 2 was repeated, except that a mixture (2:1 mixture) of 1600 g of citric acid and 800 g of lactic acid was used. The packaged boiled noodles thus treated had a pH of 4.1 and showed preservative effect, noodle quality and palatable taste all similar to those of the boiled noodles obtained in Example 2.

EXAMPLE 4

To 5 kg of wheat flour was added 1.4 l of water and the mixture was processed with a mixer, extruder and roller to prepare a dough which was then shaped into a spaghetti-form by the use of circular No. 14 cutting blades ($\phi = 1.9$ mm). The noodles thus obtained were boiled for 9 minutes to obtain about 12.5 kg of boiled noodles.

The boiled spaghetti thus obtained was then immersed into 70 l of a processing solution in which 560 g of citric acid and 210 g of table salt were contained. The thus immersed spaghetti was drained and then placed in packages each containing about 200 g of the boiled spaghetti. The packaged boiled spaghetti was then heat-treated at 95° C. for 30 minutes with a steam kettle. This packaged boiled spaghetti had a pH of 3.95 and 0.10% of table salt adhered thereto.

50 Packages of the thus treated boiled spaghetti were stored at 37° C. for 6 months, whereupon no spoiled product was found and both spaghetti quality and palatable taste were found excellent.

EXAMPLE 5

There was prepared 70 l of a processing solution wherein 490 g of citric acid and 350 g of table salt were dissolved. The boiled spaghetti prepared in Example 4 was immersed for 45 seconds in the processing solution kept at 35° C. After draining, 200 g of each of the thus treated boiled spaghetti were placed in packages and then heat-treated at 95° C. for 30 minutes, followed by cooling with water.

The thus treated packaged boiled spaghetti had a pH of 4.25 and table salt in an amount of 0.14% adhered to the boiled spaghetti.

EXAMPLE 6

A mixture comprising 25 kg of wheat flour, 7.0 l of water and 375 g of table salt was shaped into spaghetti of about 1.9 mm in diameter by means of a macaroni extruder. This spaghetti was boiled for 7 minutes to obtain boiled spaghetti which was then immersed for 45 seconds into a solution prepared by dissolving 800 g of citric acid and 60 g of sodium glutamate in 100 l of water and kept at 30° C. The boiled spaghetti was then placed into 330 packages each containing 200 g of the boiled spaghetti and steam heated at 95° C. for 30 minutes to obtain packaged boiled spaghetti.

The boiled spaghetti as packaged had a pH of 4.1, 0.12% of table salt and 0.01% of sodium glutamate, both adhered to the boiled spaghetti.

EXAMPLE 7

A mixture comprising 25 kg of wheat flour and 7.0 l of water was shaped into a spaghetti form of 1.9 mm in diameter by means of a macaroni extruder. The spaghetti thus obtained were boiled for 7 minutes to obtain boiled spaghetti. The boiled spaghetti was immersed 45 seconds into a solution prepared by dissolving 800 g of citric acid, 400 g of table salt and 60 g of sodium glutamate in 100 l of water and keeping the solution at 30° C. The boiled spaghetti was then put into 330 packages each containing 200 g of the boiled spaghetti and then steam-heated at 95° C. for 30 minutes to obtain the packaged boiled spaghetti.

The packaged boiled spaghetti had a pH of 4.1, and 0.13% of table salt and 0.01% of sodium glutamate, both having adhered to the boiled spaghetti.

EXAMPLE 8

Boiled spaghetti was obtained according to the procedure of Example 7, and the boiled spaghetti was then immersed for 45 seconds into a solution prepared by dissolving 460 g of citric acid, 230 g of lactic acid and 250 g of table salt in 100 l of water and keeping at 30° C. The boiled spaghetti thus treated were packaged and steamheated in the same manner as in Example 7 to obtain packaged boiled spaghetti.

The boiled spaghetti thus obtained had a pH of 4.3, and 0.05% of table salt having adhered to the boiled spaghetti.

EXAMPLE 9

The boiled spaghetti obtained according to the procedure of Example 4 was immersed for 60 seconds in 30 l of water kept at 40° C. in which 75 g of citric acid, 150 g of lactic acid, 105 g of table salt and 27 g of sodium glutamate were dissolved. Thereafter, the same procedure as in Example 4 was repeated to obtain packaged boiled spaghetti. The boiled spaghetti thus obtained had a pH of 4.0, and 0.12% of table salt and 0.02% of sodium glutamate, both having adhered to the boiled spaghetti.

EXAMPLE 10

A mixture comprising 10 kg of wheat flour and 3.0 l of water was shaped into a dough sheet by means of a press roll and the dough sheet was cut with a square cutting blade No. 10 into raw Japanese noodles (cross-section of about 2 mm×3 mm). The raw Japanese noodles were boiled for 20 minutes to obtain about 28 kg of boiled noodles. The boiled noodles thus obtained were immersed for 45 seconds into a solution prepared by dissolving 400 g of citric acid and 200 g of table salt in 50 l of water and keeping at 30° C. The boiled noodles thus treated were placed into packages each containing 200 g of the boiled noodles, followed by steam-heating at 95° C. for 30 minutes to obtain packaged boiled noodles. The packaged boiled noodles had a pH of 4.1, and 0.11% of table salt having adhered to the boiled noodles.

EXAMPLE 11

Boiled Japanese noodles were obtained by repeating the operation of Example 10 except that 10 kg of wheat flour was kneaded together with 100 g of table salt and 3.0 l of water. The boiled noodles thus obtained were immersed for 45 seconds in 50 l of water in which 400 g of citric acid and 100 g of table salt were dissolved. The boiled noodles thus treated had a pH of 4.1, and 0.15% of table salt having adhered thereto.

What we claim is:

1. In a process for preparing wheat-flour based pastas for commercial distribution at ambient temperatures which are ready for rapid cooking, comprising boiling said pastas and washing said boiled pastas with water, the improvement which comprises immersing the boiled pastas in an aqueous solution containing (a) at least one of citric acid and lactic acid and (b) table salt, then packaging and heat sterilizing the pastas which have been immersed, said aqueous solution having a pH such that the pH of the boiled pastas, after immersion, is about 3.9 to about 4.3.

2. The process of claim 1 wherein said pastas are selected from the group consisting of macoroni, spaghetti, vermicelli and Japanese style noodles.

3. The process of claim 2 wherein said Japanese style noodles are composed principally of wheat flour with whole eggs or egg yolks.

4. The process of claim 1 wherein said aqueous solution further comprises sodium glutamate.

5. The process of claim 1 wherein said acid is present in said aqueous solution in a concentration of about 0.4% to about 1.0%.

6. The process of claim 1 wherein said table salt is present in said aqueous solution in a concentration of about 0.2% to about 0.8%.

7. The process of claim 4 wherein said sodium glutamate is present in said aqueous solution and in a concentration of about 0.02% to about 0.09%.

8. The process of claim 1 wherein said acid is present in said aqueous solution in a concentration of about 0.5% to about 0.8%.

9. The process of claim 1 wherein said table salt is present in said aqueous solution in a concentration of about 0.3% to about 0.6%.

10. The process of claim 4 wherein said sodium glutamate is present in said aqueous solution in a concentration of about 0.04% to about 0.06%.

11. The process of claim 1 wherein said immersion is carried out for a period of about 30 to about 60 seconds and said aqueous solution is maintained at a temperature of from ambient temperature to about 50° C.

12. The process of claim 2 wherein said immersion is carried out for a period of about 30 to about 60 seconds and said aqueous solution is maintained at a temperature of from ambient temperature to about 50° C.

13. The process of claim 3 wherein said immersion is carried out for a period of about 30 to about 60 seconds and said aqueous solution is maintained at a temperature of from ambient temperature to about 50° C.

14. The process of claim 4 wherein said immersion is carried out for a period of about 30 to about 60 seconds and said aqueous solution is maintained at a temperature of from ambient temperature to about 50° C.

15. The process of claim 9 wherein said immersion is carried out for a period of about 30 to about 60 seconds and said aqueous solution is maintained at a temperature of from ambient temperature to about 50° C.

16. The process of claim 10 wherein said immersion is carried out for a period of about 30 to about 60 seconds and said aqueous solution is maintained at a temperature of from ambient temperature to about 50° C.

17. The process of claim 11 wherein said aqueous solution is maintained at a temperature between about 30° C. and about 40° C.

* * * * *